(12) United States Patent
Dall'Asta

(10) Patent No.: US 7,112,765 B2
(45) Date of Patent: Sep. 26, 2006

(54) FOOD COOKING CONTAINER WITH MONITORING MEANS FOR MONITORING THE OPERATING TEMPERATURE THEREOF

(75) Inventor: Massimo Dall'Asta, Casalmaggiore (IT)

(73) Assignee: Ballarini Paolo & Figli S.p.A., Mantovano (IT)

( * ) Notice: Subject to any disclaimer, the term of this patent is extended or adjusted under 35 U.S.C. 154(b) by 0 days.

(21) Appl. No.: 10/993,459

(22) Filed: Nov. 19, 2004

(65) Prior Publication Data
US 2005/0173408 A1 Aug. 11, 2005

(30) Foreign Application Priority Data
Nov. 21, 2003 (IT) .................. MI2003A-00 2266

(51) Int. Cl.
F27D 4/00 (2006.01)

(52) U.S. Cl. ...................... 219/438; 219/497; 219/240; 219/241; 219/269

(58) Field of Classification Search ................ 219/438, 219/497, 240, 241, 262, 264, 269, 386, 413, 219/441
See application file for complete search history.

(56) References Cited

U.S. PATENT DOCUMENTS 4,574,184 A * 3/1986 Wolf et al. .................. 219/440
5,441,344 A * 8/1995 Cook, III ..................... 374/141

* cited by examiner

Primary Examiner—Shawntina Fuqua
(74) Attorney, Agent, or Firm—Kirschstein, et al.

(57) ABSTRACT

A food cooking container, with means for monitoring the operating temperature thereof, comprises, in the handle support (3) and/or in the handle (2) of the container, temperature monitoring and indicating means for monitoring and indicating a preset operating temperature of the container.

10 Claims, 2 Drawing Sheets

FOOD COOKING CONTAINER WITH MONITORING MEANS FOR MONITORING THE OPERATING TEMPERATURE THEREOF

BACKGROUND OF THE INVENTION

The present invention relates to a food cooking container with monitoring means for monitoring the operating temperature thereof.

The prior art already discloses the use of different heating sources for cooking food, such as gas sources or electrically operated heating sources.

Some of the above mentioned heating sources can be adjusted to provide a set temperature, thereby preventing, for example, water contained in a container from fully evaporating, or preventing a food article, such as a steak, from charring.

The above mentioned prior heating or heat sources, however, have the drawback that they require a continuous monitoring of the container or vessel containing the food article to be cooked, since, in a case of a poor monitoring, it could happen that the container, such as a casserole or saucepan, would be excessively over-heated, thereby damaging not only the food article held therein, but also the container itself, for example its anti-adhering lining, thereby greatly decreasing the operating life of the cooking container or vessel.

SUMMARY OF THE INVENTION

Accordingly, the aim of the present invention is to overcome the above drawbacks of the prior art, by providing a novel food cooking container, which comprises monitoring and signaling means for indicating to an user an exceeding of a set temperature threshold or limit.

According to one aspect of the present invention, the above aim is achieved by a food cooking container, with monitoring means for monitoring an operating temperature thereof, characterized in that said container comprises, in a support of a handle thereof, and/or in said handle, temperature monitoring and indicating means, for monitoring and indicating a preset operating temperature of said container.

Further characteristics can be detected by the following disclosure and dependent claims.

BRIEF DESCRIPTION OF THE DRAWINGS

The subject matter of the present invention will be disclosed in a more detailed manner hereinafter, with reference to an embodiment thereof, given only by way of an example, and being shown in the accompanying drawings, where.

DESCRIPTION OF THE PREFERRED EMBODIMENT

Figure 1:
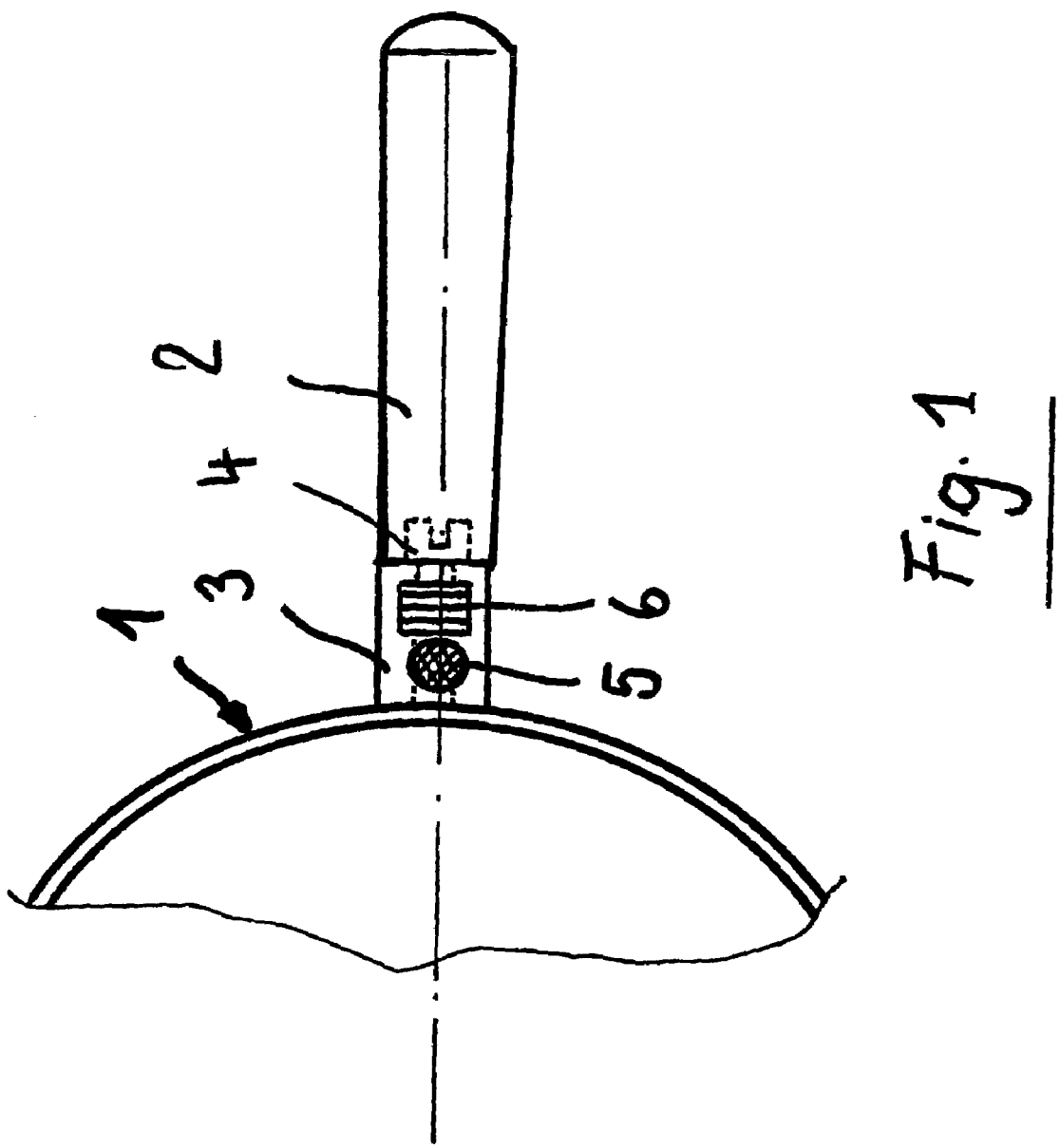
FIG. 1 is a top plan view showing a saucepan with a handle therefor, including temperature monitoring and indicating means according to the present invention.

As shown in FIG. 1, the container or vessel 1, such as a saucepan, comprises a container handle 2, coupled to said container 1 for example by a metal tubular support element 3 rigid with the container.

The handle 2 is clamped to the body of the container 1 for example by a clamping screw 4.

In said support element 3, or also in said handle 2, it is possible to provide, in a suitably tight recess, temperature monitoring and indicating means, such as a pilot light, indicated by 5, and/or an acoustical signaling or warning element, indicated by 6.

Owing to the provision of said pilot light 5 and acoustical signaling or warning element 6, and by using means which will be disclosed in a more detailed manner hereinafter, it will be possible to indicate to a user, in a visual or acoustical manner, the fact that the container 1 has achieved an excessive temperature, because of an uncontrolled and excessive over-heating.

Figure 2:
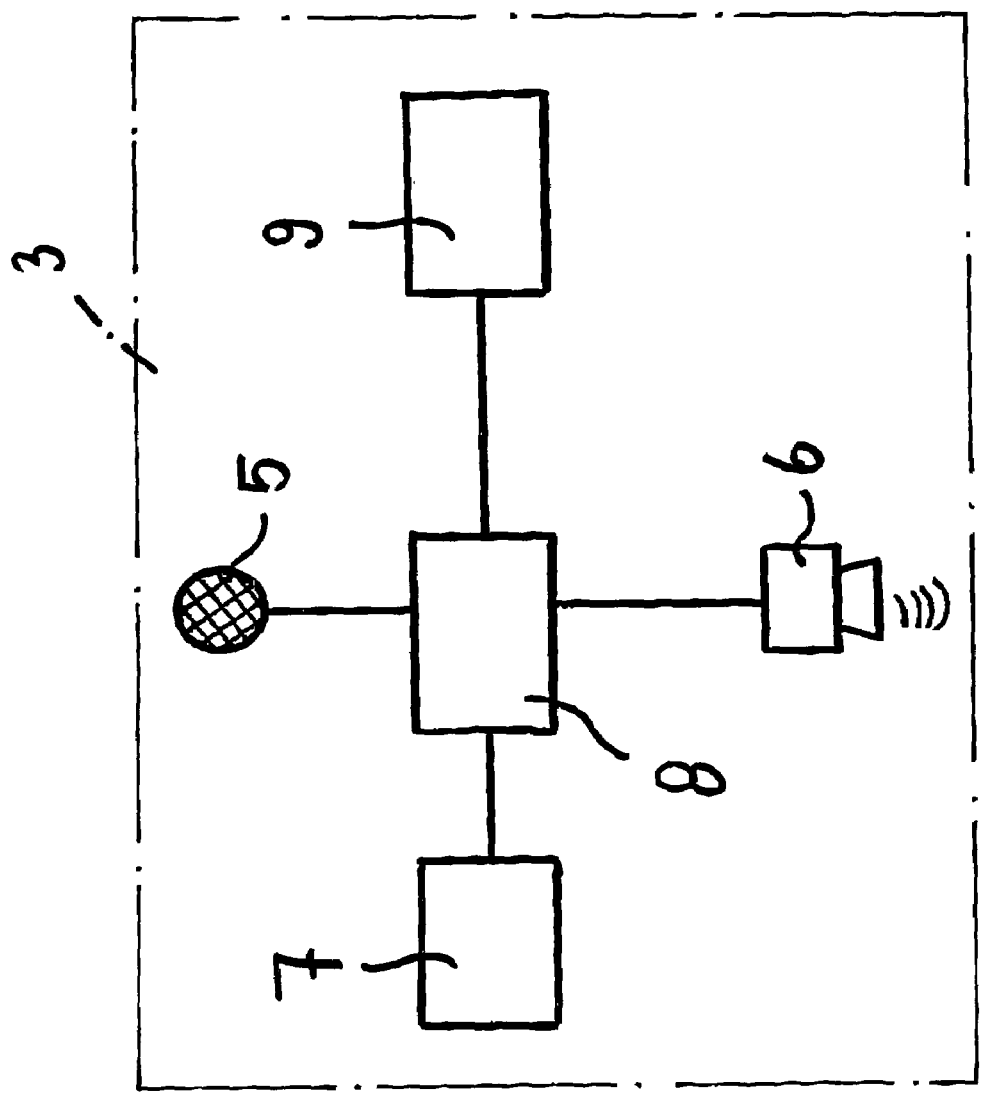
FIG. 2 shows a possible embodiment of a circuit for carrying out the invention.

As shown in FIG. 2, inside the support element 3 housing said pilot light 5 and/or acoustical indicating element 6, it is also arranged a temperature sensor 7, suitable to detect the temperature of the container 1, said temperature sensor 7 comprising, for example, an electrically and electronically operated thermostatic switch.

Said thermostatic switch 7 is coupled to a control unit 8, including, for example, a microprocessor, operating to amplify the signal derived from the temperature thermostat 7.

Advantageously, said microprocessor 8 comprises in store means thereof a stored program for processing the temperature indicated by the sensor 7 and compare said indicated temperature with a preset rated temperature value for the cooking vessel or container 1, which rated temperature value would be stored in a non volatile memory.

As shown, the microprocessor 8 is supplied with the required electric current through a battery 9, advantageously a photovoltaic microcell, which can be recharged by light beams. In said microprocessor 8 a high temperature value, for example of 200° C., is stored. As the container 1 arrives at such still tolerable temperature, the microprocessor 8 will drive, for example, said pilot light 5, to cause the latter to blink or switch on, thereby indicating to the user that a temperature slightly less the temperature limit has been achieved.

As the above limit temperature is exceeded, for example to a temperature of 300° C., the microprocessor will operate the warning device 6 which will provide an acoustical signal, so as to warn the user of the emergency or dangerous condition.

In this connection it should be apparent that it would not be necessary to jointly use the light indicating device 5 and acoustic indicating device 6, since it would be optionally possible to alternately use either one or the other of said signaling or indicating devices.

Thus, by the invention as disclosed, it is possible to detect, by using very inexpensive and reliable monitoring means, which can be enclosed in a sealed enclosure, and which are insensitive both to heat and moisture and/or liquids, that the container 1 has achieved a dangerous temperature, both with respect to the cooking container body and the food products container herein.

The invention claimed is:
1. A food cooking container, comprising:
   a) a handle structure for the container; and
   b) operating temperature monitoring and indicating means in the handle structure, for monitoring an operating temperature and for indicating a preset operating temperature of the container, the temperature monitoring and indicating means including a temperature sensor operatively coupled to a control device which is, in turn, operatively coupled to an electric battery, the control device including a microprocessor and a memory for storing actuating temperatures for actuating the temperature monitoring and indicating means.

2. The container according to claim 1, in that the temperature monitoring and indicating means comprise a pilot light.

3. The container according to claim 1, in that the temperature monitoring and indicating means comprise an acoustic indicating means.

4. The container according to claim 1, in that the electric battery comprises a photovoltaic rechargeable microcell.

5. The container according to claim 1, in that the temperature sensor comprises a thermostatic switch.

6. The container according to claim 5, in that the control device comprises an amplifier for amplifying a signal provided by the thermostatic switch.

7. The container according to claim 1, in that the temperature monitoring and indicating means are enclosed is a sealed mounting body, which is insensitive to the operating temperature of the container and is sealed with respect to moisture or liquids.

8. The container according to claim 1, wherein the handle structure includes a handle and a tubular support, and wherein the temperature monitoring and indicating means is mounted in one of the handle and the support.

9. A food cooking container, comprising:
a) a handle structure for the container; and
b) operating temperature monitoring and indicating means in the handle structure, for monitoring an operating temperature and for indicating a preset operating temperature of the container, the temperature monitoring and indicating means including a temperature sensor operatively coupled to a control device which is, in turn, operatively coupled to an electric battery, the control device including a microprocessor and a program memory for storing a program for processing the operating temperature sensed by the temperature sensor, and the operating temperature being compared with a rated temperature preset for the container and stored in a non-volatile memory.

10. A food cooking container, comprising:
a) a handle structure for the container; and
b) operating temperature monitoring and indicating means in the handle structure, for monitoring an operating temperature and for indicating a preset operating temperature of the container, the temperature monitoring and indicating means including a temperature sensor operatively coupled to a control device which is, in turn, operatively coupled to an electric battery, the temperature monitoring and indicating means including a pilot light and an acoustic signal emitter; in that, in the control device, a first temperature limit value of substantially 200° C. is stored; and in that, as the first temperature limit value is achieved, the pilot light is actuated; and in that the control device further stores a second temperature limit value of about 300° C. which, as it is achieved, causes the acoustic signal emitter to be actuated.

* * * * *